T. T. LECROY.
COTTON CHOPPER AND CULTIVATOR.
APPLICATION FILED JUNE 11, 1907.
900,106.
Patented Oct. 6, 1908.
3 SHEETS—SHEET 2.
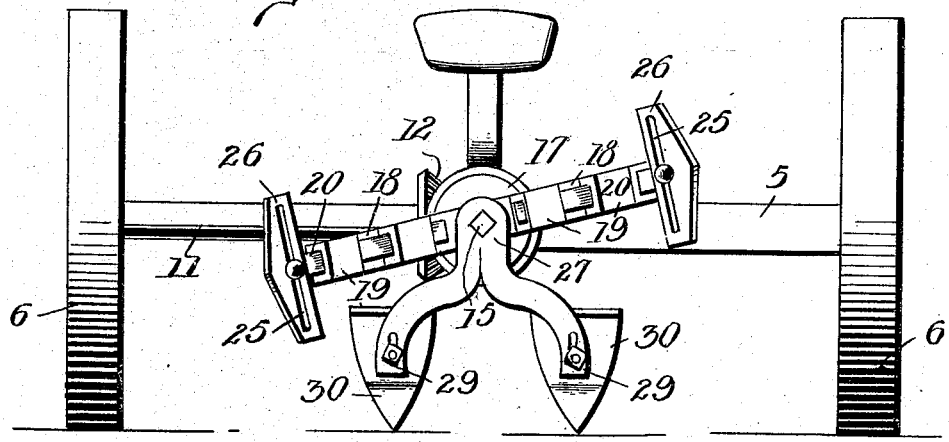
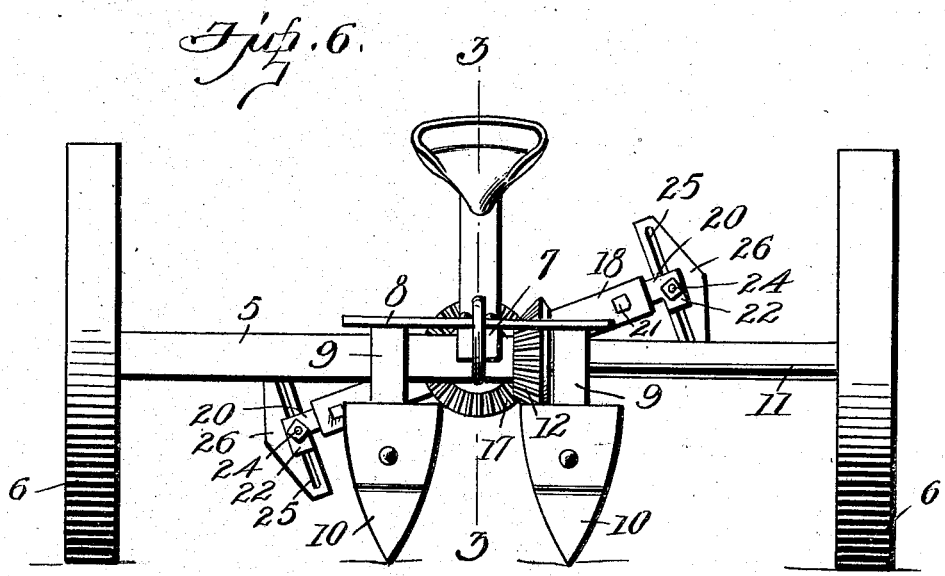

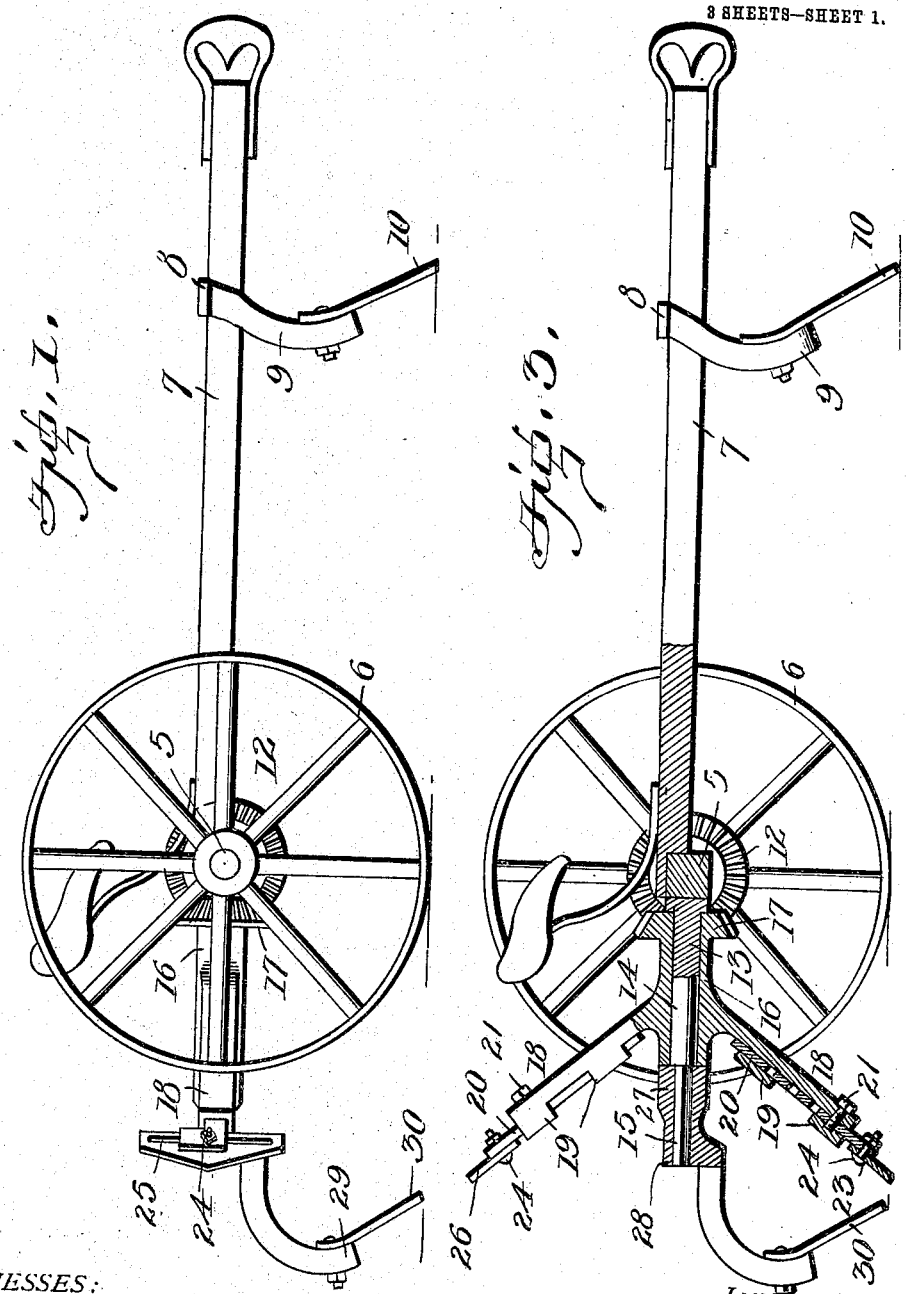

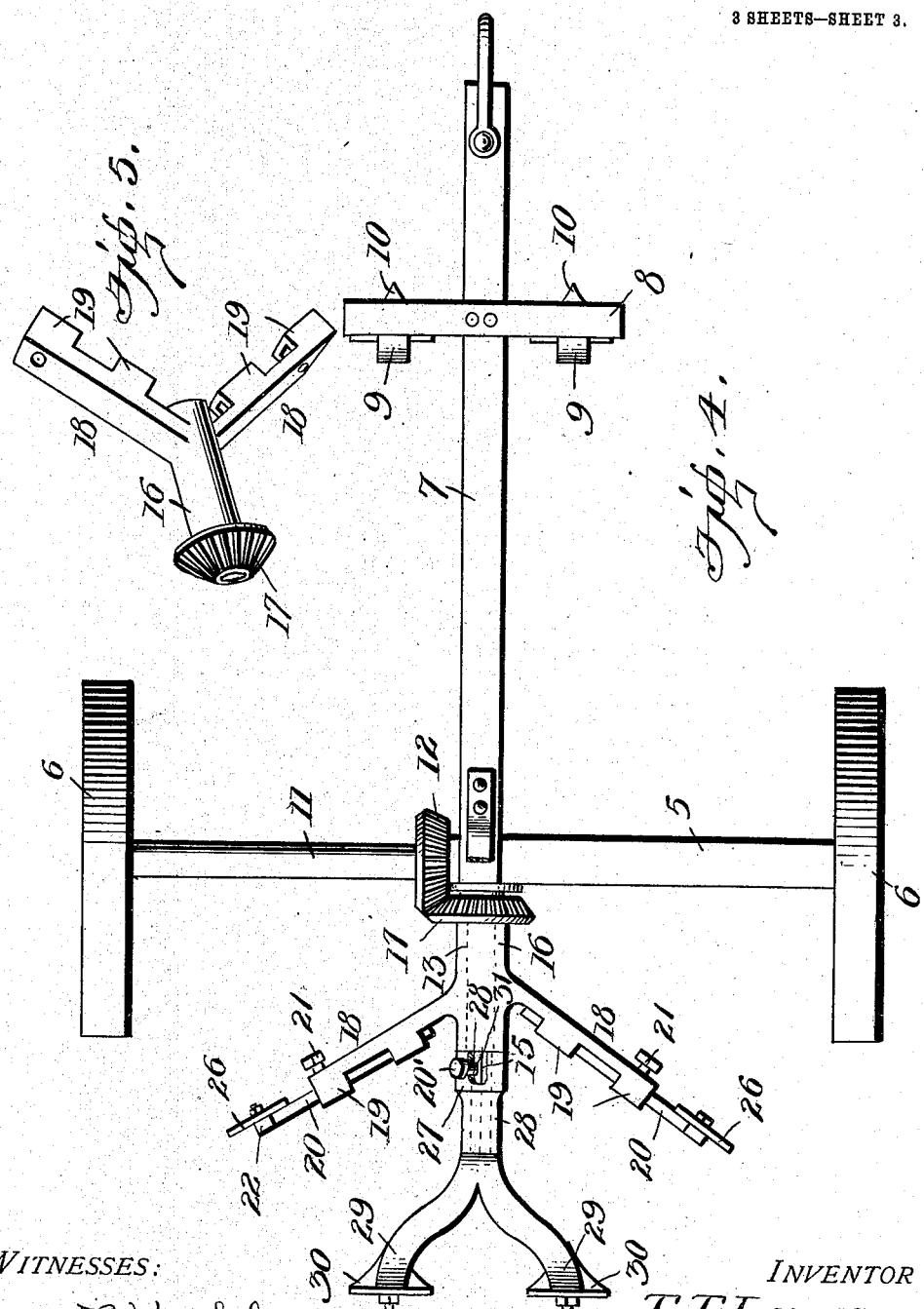

UNITED STATES PATENT OFFICE.

THOMAS T. LECROY, OF LONSDALE, ARKANSAS.

COTTON CHOPPER AND CULTIVATOR.

No. 900,106.　　　Specification of Letters Patent.　　　Patented Oct. 6, 1908.

Application filed June 11, 1907.　Serial No. 378,412.

*To all whom it may concern:*

Be it known that I, THOMAS T. LECROY, a citizen of the United States, residing at Lonsdale, in the county of Garland and State of Arkansas, have invented certain new and useful Improvements in Cotton Choppers and Cultivators, of which the following is a specification.

This invention relates to farm machinery and more particularly to cotton choppers and cultivators, and has for its object to provide a machine which will be constructed and arranged to first chop the rows of cotton plants, and immediately thereafter cultivate the rows.

Another object is to provide a machine which will include a novel arrangement of parts, eliminating certain elements by the provision of a single member for holding the chopping mechanism and the cultivating mechanism in position. It will therefore be seen that the complete object of applicant's invention is to provide a cotton chopper and cultivator which will perform the complete operation of treating the cotton, and which will possess particular advantages by reason of its simplicity of parts and arrangement thereof facilitating cleaning, replacements, etc.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the present chopper, Fig. 2 is a rear elevation, Fig. 3 is a central vertical section on line 3—3 of Fig. 2, Fig. 4 is a top plan, Fig. 5 is a detail perspective view, showing the mounting of the revoluble sleeve, Fig. 6 is a front view.

Referring now to the drawings, the present invention comprises an axle 5 provided with wheels 6 at its ends, and having a forwardly extending tongue 7 secured thereto. A transverse member 8 is secured upon the tongue and carries depending stocks 9 at its ends, to which are secured excavating plows 10. A sleeve 11 is revolubly engaged with the axle 5 at one end thereof, and it is to this sleeve that one of the wheels 6 is secured, for rotation of the sleeve therewith. The sleeve 11 carries a bevel gear 12 at its inner end for a purpose to be presently described. Secured to the rearward face of the axle 5, in alinement with the tongue, there is a rearwardly extending arm 13, including an inner cylindrical portion 14 and a rearward squared portion 15. A revoluble sleeve 16 is engaged with the portion 14 of the arm and carries a bevel gear 17 at its inner portion, which meshes with the gear 12 as shown. The sleeve 16 carries a plurality of radially extending, rearwardly inclined arms 18, each having a pair of yokes 19 thereon, alining longitudinally of the arm for the reception of stocks 20 which are slidable in the yokes, set screws 21 being provided to hold the stocks at different points of their movement. The stocks 20 have laterally turned outer end portions 22 provided with openings 23 in which bolts 24 are engaged, and these bolts are also engaged in longitudinal slots 25 formed in chopping hoes 26, which extend transversely of the stocks 20. The length of the slots 25 is such that the hoes are adjustable transversely of the arms 18, as will be readily understood.

To hold the sleeve 16 in position upon the arm 13, a cap member 27 is engaged with the squared portion 15 of the arm and rests against the outer end of the sleeve. This cap member carries at its rearward portion a pair of downwardly extending spaced arms 29, provided with covering shovels 30 at their lower ends. The cap member has an opening 28' therein which receives a retaining bolt 20' engaging the portion 15 of the arm 13.

In use, the present machine is driven along a cotton row with the plows 10 at opposite sides thereof, so that they will excavate the earth from the stalks. Movement of the machine revolves the sleeve 16, as will be understood, to bring the hoes 26 into engagement with the cotton, to chop the latter, after which the row is again hilled up by the shovels 30.

From the foregoing, it will be seen that cap member 27 acts to hold the sleeve 16 in position, and with the gear 17 in mesh with the the gear 12, this cap member also supporting the shovels 30 in position to treat the rows of cotton stalks after they have been chopped by the hoes 26. The cap member thus performs a double function, and eliminates additional holding means for the sleeve.

Furthermore, the cap member may be easily removed, which not only brings the shovels 30 out of position to interfere with the removal of the sleeve 16 and the hoes 26, but also releases the sleeve to permit of removal.

What is claimed is:

1. A combined cotton chopper and cultivator comprising a wheeled axle, a rearwardly extending arm carried by the axle, a sleeve revolubly engaged with the arm, means for driving the sleeve, chopping hoes connected with the sleeve, a cap member engaged with the arm rearwardly of the sleeve in position to prevent removal of the sleeve, said cap member being removable, and covering shovels connected with the cap member.

2. In a cotton chopper and cultivator, the combination with an arm, of a sleeve revolubly mounted upon the arm, said sleeve being arranged for removal from the arm, chopping hoes carried by the sleeve, a cap member removably engaged with the arm in position to hold the sleeve thereupon, and covering shovels carried by the cap member for movement therewith when the cap member is removed, said covering shovels lying normally in a position rearwardly of the chopping hoes.

3. In a machine of the class described the combination with a revoluble axle, of a gear carried by the axle, an arm connected with the axle and extending laterally therefrom, a sleeve revolubly and removably engaged upon the arm, a gear carried by the sleeve and meshing with the gear of the axle for rotation thereby, chopping hoes carried by the sleeve, a cap member removably engaged with the arm rearwardly of the sleeve in position to prevent removal of the sleeve and in position to hold the sleeve with its gear in mesh with that of the axle, means for holding the cap member in position, and covering shovels carried by the cap member and arranged for removal from the arm when the cap member is removed.

In testimony whereof I affix my signature, in presence of two witnesses.

THOMAS T. LECROY.

Witnesses:
   J. P. HENDERSON,
   J. M. LOWE.